United States Patent

[11] 3,630,821

[72] Inventors William K. Miller;
Seymour Katz, both of Southfield; Willard
W. Bach, Rochester, all of Mich.
[21] Appl. No. 3,600
[22] Filed Jan. 19, 1970
[45] Patented Dec. 28, 1971
[73] Assignee General Motors Corporation
Detroit, Mich.
Original application July 20, 1967, Ser. No.
614,829, now Patent No. 3,511,899, dated
May 12, 1970. Divided and this application
Jan. 19, 1970, Ser. No. 3,600

[54] POPCORN ENERGY ABSORBER
2 Claims, 3 Drawing Figs.
[52] U.S. Cl. ............................................. 161/168,
107/16, 161/159, 161/162
[51] Int. Cl. ................................................ B32b 3/26,
B32b 5/20
[50] Field of Search ............................................. 161/159,
162, 168; 264/26, 51, 53, 109; 99/238.1; 107/16

[56] References Cited
UNITED STATES PATENTS
1,176,949  3/1916  Eakins ........................... 107/16
1,747,176  2/1930  McManus ..................... 264/109
2,649,958  8/1953  Rausch ........................... 99/171
2,865,800  12/1958  Stastny ........................... 264/46
2,959,508  11/1960  Graham et al. ................ 264/54
3,029,751  4/1962  Gilmore ......................... 107/16
3,331,899  7/1967  Immel ............................ 264/26

Primary Examiner—John T. Goolkasian
Assistant Examiner—George W. Moxon, II
Attorneys—William S. Pettigrew and George A. Grove ABSTRACT: An energy-absorbing article comprised of a plurality of expanded popcorn kernels closely packed together and bonded together by the mechanical interlocking of the irregular outer surfaces of the expanded kernels, the density of the article being 5–15 pounds per cubic foot.

PATENTED DEC 28 1971　　　　　　　　　　　　　3,630,821

INVENTORS.
*William K. Miller,*
*Seymour Katz &*
BY *Willard W. Bach*

*George A. Grove*
ATTORNEY

POPCORN ENERGY ABSORBER

This is a division of U.S. Pat. No. 3,511,899, issued May 12, 1970.

This invention relates to the employment of popcorn as an energy-absorbing material. More particularly, this invention relates to a method of processing popcorn in which the kernels are expanded and the expended kernels are simultaneously compressed and molded into a unitary article wherein the individual expanded kernels are bonded together by at least the interlocking of their irregular outer surfaces.

The utility of expanded popcorn (or popped corn) as energy-absorbing material is shown in Rausch, U.S. Pat. No. 2,649,958. Therein expanded popcorn is employed as a lightweight packing material to provide a shock-absorbing cushion around glass bottles and the like. In this embodiment, a number of loose individual kernels of expanded popcorn are poured around the fragile container as a packing medium. However, if it is desired to process expanded corn to form an impact-absorbing article for use as an automobile interior component such as an instrument panel, headrest or the like, the employment of loose expanded popcorn kernels is not advantageous. The light, bulky, irregularly shaped individual kernels of popcorn cannot be readily stored, handled or molded by production line techniques. If it is desired to bond together a number of popped kernels into a predetermined configuration having close tolerance limits, it would be necessary to coat the popped material with a binder material and then select a quantity of properly sized kernels suitable for building up the unitary article. This is deemed an arduous and impractical method for high-volume production. Until the subject invention, no means was available for readily forming a unitary energy-absorbent article of popcorn to a predetermined shape and tolerance.

Accordingly, it is an object of the present invention to provide an efficient method of processing popcorn to produce a unitary relatively high-density inpact-absorbing article of mechanically interconnected kernels of popped corn.

It is a more specific object of the present invention to provide a method of simultaneously expanding a plurality of popcorn kernels in a closed mold to form a unitary energy-absorbing article.

These and other objects and advantages are accomplished in accordance with the invention by first providing a two-part mold which is constructed and arranged so as to define a cavity which is in the configuration of the desired energy-absorbing article. Preferably, the mold is formed of a material which is substantially transparent to dielectric heating radiation or microwave heating radiation. A measured quantity of popcorn is added to the mold such that upon expansion of the major portion of the kernels they will completely fill the mold to form an article having a density preferably in the range of about 5–15 pounds per cubic foot. The mold is then closed and the popcorn is subjected to dielectric or microwave heating so that the moisture therein is rapidly vaporized and permitted to escape from the mold. As is well known, vaporization of the moisture causes the bursting or expansion of the popcorn kernels into larger masses having irregular outer surfaces. The expanded popcorn rapidly fills the mold. The confined space with the mold forces the expanding kernels together whereby they are compressed and caused to bond to one another by the mechanical interlocking of the protuberances from their surfaces. Heating is continued to cause as many of the kernels as possible to pop without excessive blackening or charring of the expanded kernels. The mold is then opened and the formed popcorn article removed therefrom.

The resulting article has sufficient mechanical strength to be removed from the mold, despite the tight fit, and to undergo normal careful handling. It is comprised of a plurality of mechanically interlocked expanded popcorn kernels. The major portion of the article by weight and volume is made up of these expended kernels. However, there may be a small amount of residual unpopped kernels trapped and held in the matrix of expanded corn. The article may be provided with a suitable skin, made of sheet plastic for example, and employed as an energy-absorbing material in an automobile interior. In many instances, however, it will be desired to strengthen the bonds between the individual popcorn kernels by employing a suitable binder. A thermoplastic resin, such as polyvinyl alcohol, polyvinyl chloride, polystyrene, or polyethylene, is preferred for this purpose. In this embodiment of the invention, a solution of a thermoplastic resin is mixed with the unexpanded kernels before the molding operation is undertaken. Preferably 1–10 percent by weight of the synthetic thermoplastic resin is employed based upon the weight of the popcorn kernels. A suitable solvent is selected which will dissolve the thermoplastic resin so that it may be dispersed over the kernels. Preferably, the solvent is relatively low boiling, preferably not substantially above the boiling point of water, so that it is vaporized during the molding operation or readily evaporated from the unitary article subsequent to molding without burning or charring the expanded popcorn kernels therein. The residual film of thermoplastic resin serves as an adhesive supplementing the mechanical bonding of the individual kernels.

A better understanding of the invention will be acquired from a detailed description thereof, throughout which description reference will be made to the attached drawings in which.

Figure 1:
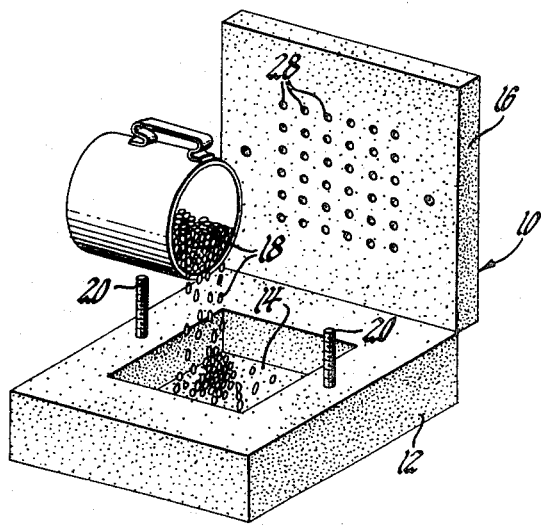
FIG. 1 shows popcorn being added to an open two-part mold.
Figure 3:
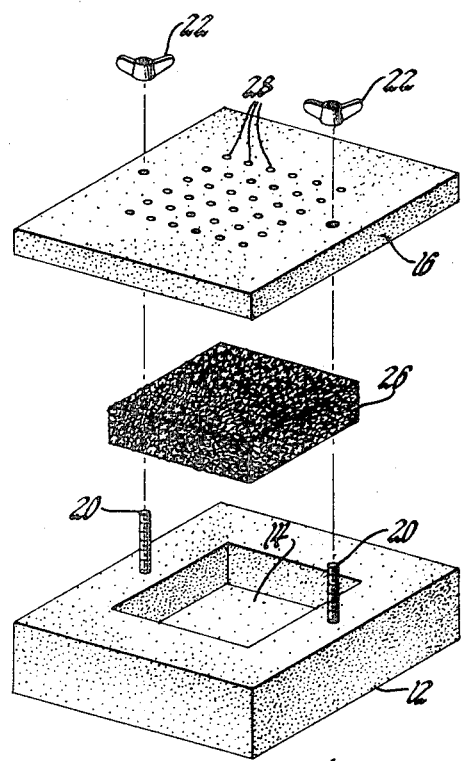
FIG. 3 shows an exploded view of the open mold and finished molded popcorn article at the completion of the process.
Figure 2:
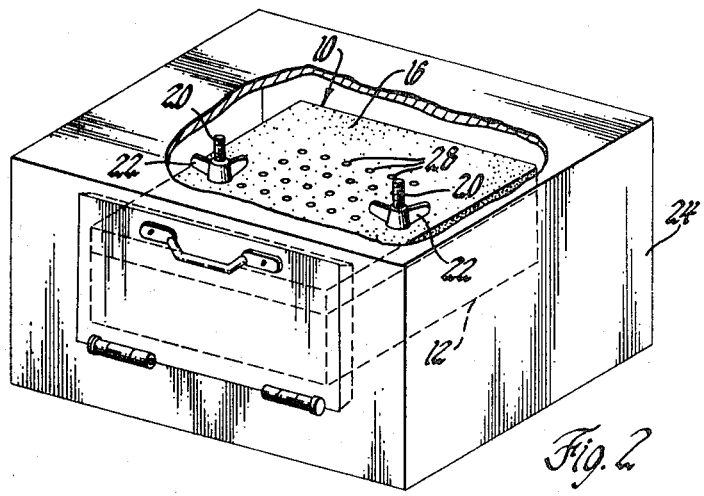
FIG. 2 shows a closed mold being subjected to microwave radiation in a microwave oven.

A specific example will assist in illustrating the principals of the invention. In FIGS. 1, 2 and 3 is shown a two-part mold 10 formed of polypropylene, which is substantially transparent to microwave radiation. The bottom portion 12 of the mold has a cavity 14 in the configuration of a 6 inch × 6 inch × 1 inch rectangular slab. The top member 16 of the mold defines the upper surface of the slab and provides a lid for the mold. Top mold member is provided with a number of small diameter vent holes 28 to permit escape of water or other vapors. One hundred thirty grams of popcorn kernels 18 were added to the mold cavity 14. The mold was closed and the mold halves clamped together by bolt 20 and wing nut 22 means as shown in FIG. 2. The mold was heated in a 2,450 megacycle, 3.2 kilowatt microwave oven 24 for about 2 minutes. The mold was then removed from the oven, opened and the compacted and molded popcorn slab 26 removed. The density of this material was about 13.7 pounds per cubic foot. The employment of unexpanded popcorn, a polypropylene mold, and microwave heating provided an efficient and compact means of forming the impact-absorbent slab.

In another experiment popcorn articles were prepared with a thermoplastic binder incorporated therein which was observed to markedly increase the mechanical strength of the article. An aqueous solution consisting of 40 percent by weight polyvinyl alcohol and 1 percent by weight sodium chloride was prepared. The sodium chloride was employed to increase the heating rate of the water due to the microwave radiation. A two-part polypropylene mold was formed defining a cavity 8 inches × 3¾ inches × 1½ inches. Three test slabs of compressed, mechanically and resin-bonded popcorn were prepared employing varying amounts of resin binder. Each of the slabs was formed with 100 grams of popcorn kernels plus sufficient of the above-prepared solution to provide respectively 2.5 percent by weight, 5 percent by weight and 7.5 percent by weight plastic binder in the popcorn article. In each instance the solution was mixed with the kernels to obtain a relatively even distribution of the resin. Preferably, each kernel is wetted with a film of the solution. The binder-popcorn mixtures were heated in a 2450 megacycle 3.2 kilowatt microwave oven, to vaporize the water, and thereby expand and mold the popcorn. Much of the water introduced with the polyvinyl alcohol was evaporated at the same time. The balance was removed by drying the slab after molding. The residual film of polyvinyl alcohol on and between each kernel furnished an adhesive bond to supplement the mechanical bond. A slab was also molded with no thermoplastic binder. Each popcorn slab was in turn suspended on two knife edges that were 6 inches apart. A third knife edge was suspended above the slab at the midpoint and a downward force was exerted on the upper knife edge until the slab fractured. The maximum force attained prior to fracture was recorded as a relative measure of the strength of the slab. The following table summarizes the results that were obtained.

| Test Number | Weight % Plastic Binder in Pounds | Max. Force |
|---|---|---|
| 1 | 0 | 0.40 |
| 2 | 2.5 | 3.30 |
| 3 | 5 | 4.70 |
| 4 | 7.5 | 5.40 |

It is noted that the binder substantially increased the strength of the popcorn article. It is preferred that the amount of resin be limited to 10 percent by weight or less for economic reasons and to maintain the impact-absorbing properties of the popcorn.

In accordance with the invention, popcorn energy-absorbing articles have been molded in many different sizes and configurations. Experiments have been conducted to determine the impact-absorbing characteristics of these materials in a quantitative way. For example, it was desired to evaluate the character and severity of impact of a mass with a popcorn article. A number of popcorn samples were positioned on a flat, rigid bed. Impact pendulums, both spring driven or pneumatic driven, were devised to strike the article and deceleration vs. time data was taken during the impact. It was observed that the popcorn articles caused very little rebound of the pendulum, but rather stopped the impacting object almost completely. Moreover, the severity of deceleration was measurably milder than that obtained with common impact-absorbing materials such as polyurethane foams, polyvinyl chloride foams and other synthetic resin cellular materials, particularly when the density of the molded popcorn sample was in the range of 5-15 pounds per cubic foot.

In the practice of our method, it is preferred that radiant energy be employed as the source of heat for expansion of the popcorn kernels. In this regard, dielectric heating and microwave heating are preferred. When the corn is being expanded in a closed mold, heating by thermal conduction through the mold wall is undesirable because of the low rate of heat transfer through the expanded corn. The closed mold prevents the expanding corn from jumping away from the hot surface and the popped kernels char rather than conduct a substantial amount of heat to the other unexpanded kernels.

As is well known, dielectric heating characteristically involves employment of electromagnetic radiation of a frequency in the range of 1-150 megacycles. The electrically nonconducting object to be heated is positioned between electrode plates in an arrangement resembling a condenser. A high-frequency alternating current it imposed upon the electrodes. The rapid reversal of polarity on the plates affects the molecules of the nonconducting material therebetween, rapidly generating heat therein. However, as would be suggested by the described physical arrangement of electrodes and the load, dielectric heating is most readily applicable to heating forms which are substantially blocklike in configuration.

If the popcorn article is to be of a curved configuration, it may be desirable to employ microwave heating which is conventionally considered to involve the employment of that band of electromagnetic radiation spectrum having a frequency in the range of about $10^8$–$10^{12}$ cycles per second. As a practical matter, four rather specific frequencies in this defined microwave range have been allocated by the Federal Communication Commission for industrial, scientific and medical uses. These frequencies are approximately 915 megacycles per second, 2,450 megacycles per second, 5,800 megacycles per second and 22,125 megacycles per second. Of these four frequencies the lower two are generally preferred for heating purposes. In microwave heating a boxlike oven can be employed (as in FIG. 2). Radiation of the desired frequency is generated by a suitable electronic tube (not shown) and is conducted to the oven chamber (by means not shown) which contains the material to be heated.

Popcorn articles have been prepared by our method having densities from about 3.2 pounds per cubic foot (the approximate density of loose popcorn) to about 20 pounds per cubic foot. In the practice of our invention, we prefer that the density of the articles be in the range of 5-15 pounds per cubic foot, as these materials are more readily fabricated in accordance with the invention and have more desirable impact-absorbing properties. When a thermoplastic binder resin is employed the preferred density range is about 5 to 16½ pounds per cubic foot since the resin increases the weight of the article, but does not appreciably alter its volume.

As noted above, articles formed in accordance with the process wherein the individual expanded kernels are compressed so as to be interlocked one with the other, have suitable mechanical strength to be removed from the mold and to undergo normal handling. In many applications this article would be provided with a skin having a pleasing appearance and touch. The skin or other covering would also support the popcorn in its molded configuration. Where a more elastic surface touch may be required our popcorn articles may be positioned in a mold and a thin layer of plastic or rubber foam molded in situ around it.

In components where greater physical strength of the popcorn article is desired, a suitable binder may be incorporated with the kernels prior to expansion and molding. Preferably, a thermoplastic synthetic resin is uniformly distributed over the kernels in an amount of about 1-10 percent by weight of the kernels. In general, this is accomplished by dissolving the resin in a suitable solvent and mixing the solution with the kernels. Thermoplastic resins such as for example polyvinyl alcohol, polystyrene and polyethylene are suitable for this purpose. It is preferred that the solvent employed be relatively low boiling (for example about the boiling point of water or lower) so that it may be removed from the article during expansion or by a subsequent drying step without charring or burning the expanded popcorn.

It is to be understood that other suitable binder materials may also be employed in accordance with the invention, preferably in an amount up to about 10 percent of the weight of the popcorn kernels. For example, other cohesive materials such as thermosetting resins, drying oils, and the like can readily be adapted for this purpose by one skilled in the art. It will also be recognized that an improvement in the strength of the article can be obtained without the use of a solvent to disperse the binder onto the kernels. The binder may, for example, be dispersed as a fine powder, or a liquid binder may be employed.

The practice of the invention has been described in terms of a conventional two-part mold. Obviously any mold can be used which can be opened to admit popcorn kernels, closed to confine the kernels during expansion thereof, and subsequently opened or destroyed to remove the molded product.

While we have described our invention in terms of a few specific embodiments, it will be appreciated that other forms may readily be adapted by those skilled in the art and accordingly our invention should be considered limited only by the scope of the following claims.

We claim:

1. A unitary, energy-absorbing article consisting essentially of a plurality of expanded popcorn kernels closely packed together and bonded together by the mechanical interlocking of the irregular outer surfaces of said expanded kernels, the density of said article being 5–15 pounds per cubic foot.

2. A unitary, energy-absorbing article comprising a plurality of expanded popcorn kernels, which are closely packed together and bonded together by the mechanical interlocking of the irregular outer surfaces of said expanded kernels, and about 1–10 percent by weight of said popcorn of a synthetic polymeric resin which is present in said article as an adherent film on and between said expanded popcorn kernels to further bond said kernels together, the density of said article being about 5–16½ pounds per cubic foot.

* * * * *

PO-1050
(5/69)

UNITED STATES PATENT OFFICE
CERTIFICATE OF CORRECTION

Patent No. 3,630,821                      Dated December 28, 1971

Inventor(s)           William K. Miller et al

It is certified that error appears in the above-identified patent and that said Letters Patent are hereby corrected as shown below:

Column 1, line 7, "expended" should be -- expanded --; line 37, "inpact-absorbing" should be -- impact-absorbing --; line 73, "expended" should be -- expanded --. Column 3, the heading of the table should read as follows:

| Test Number | Weight % Plastic Binder | Max. Force in Pounds |
| --- | --- | --- |

Signed and sealed this 23rd day of May 1972.

(SEAL)
Attest:

EDWARD M. FLETCHER, JR.
Attesting Officer

ROBERT GOTTSCHALK
Commissioner of Patents